March 6, 1956  R. W. SHOLL  2,737,077
TESTING DEVICE FOR OBSERVING FORCE EFFECTS
ON OPTICAL INSTRUMENTS
Filed Dec. 10, 1952  3 Sheets-Sheet 1
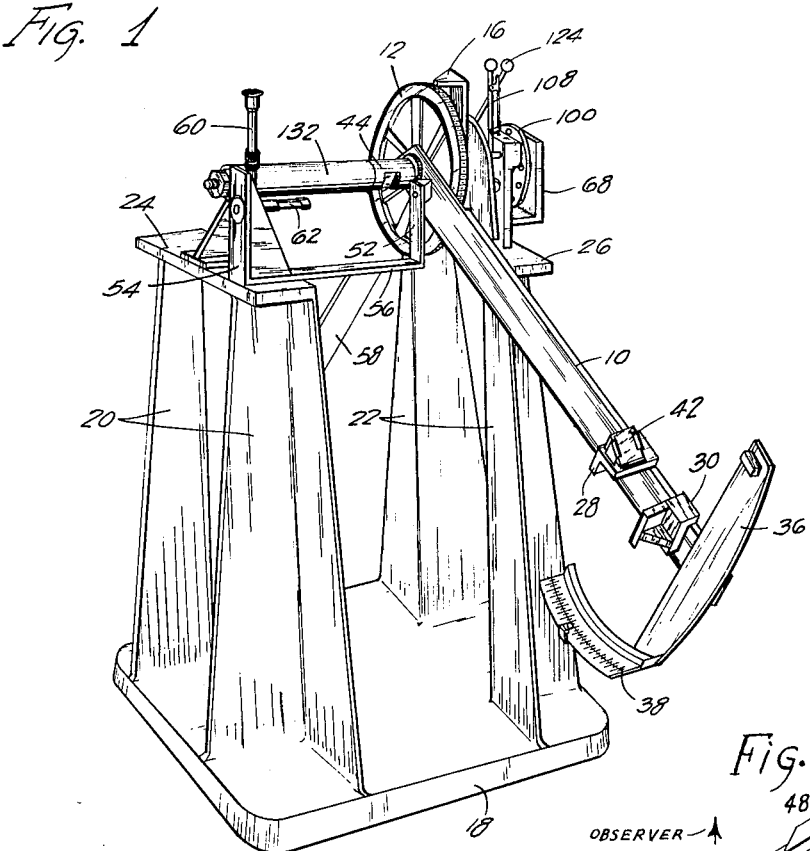
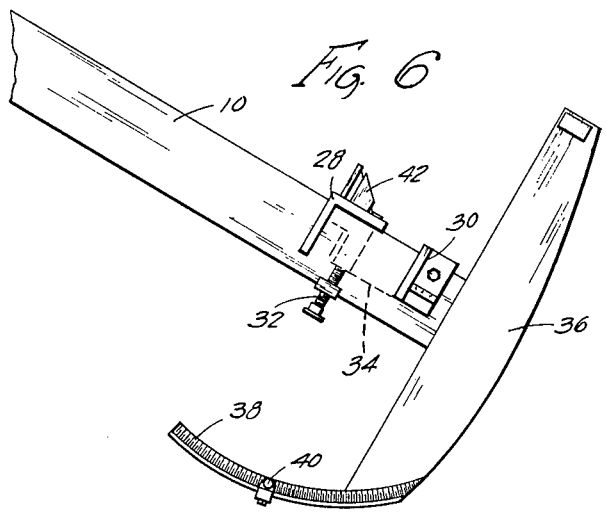
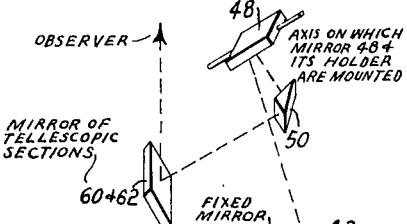
INVENTOR.
RUSSELL W. SHOLL March 6, 1956  R. W. SHOLL  2,737,077
TESTING DEVICE FOR OBSERVING FORCE EFFECTS
ON OPTICAL INSTRUMENTS
Filed Dec. 10, 1952  3 Sheets-Sheet 2
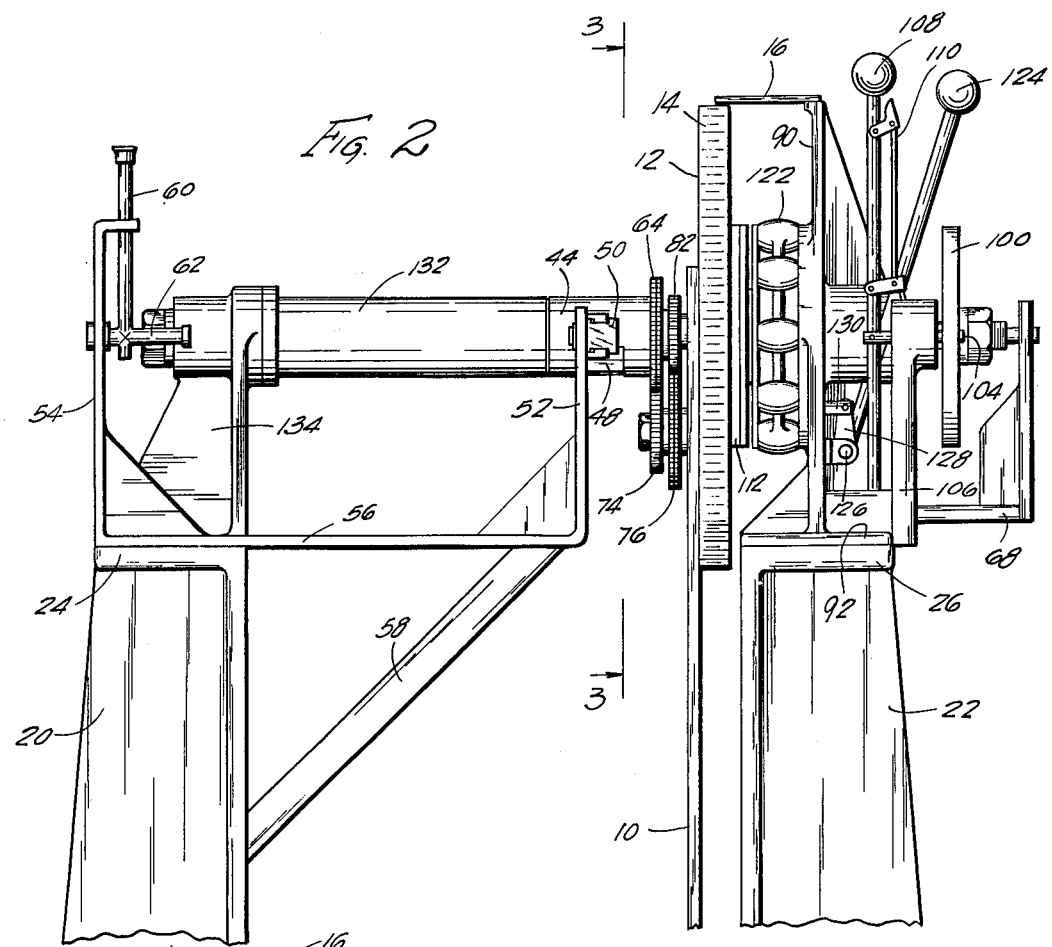
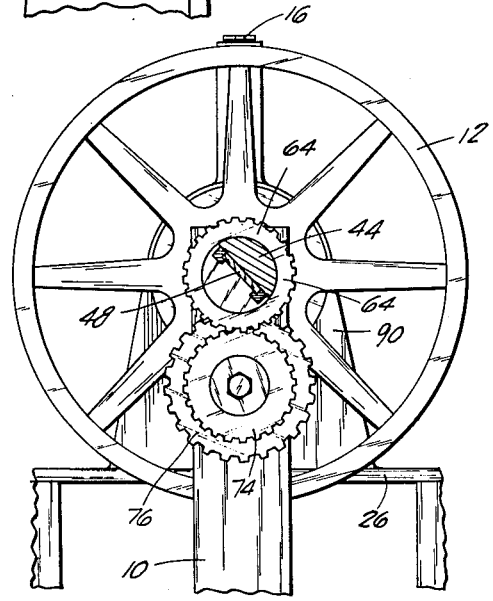
INVENTOR.
RUSSELL W. SHOLL
ATTORNEYS March 6, 1956 R. W. SHOLL 2,737,077
TESTING DEVICE FOR OBSERVING FORCE EFFECTS
ON OPTICAL INSTRUMENTS
Filed Dec. 10, 1952 3 Sheets-Sheet 3
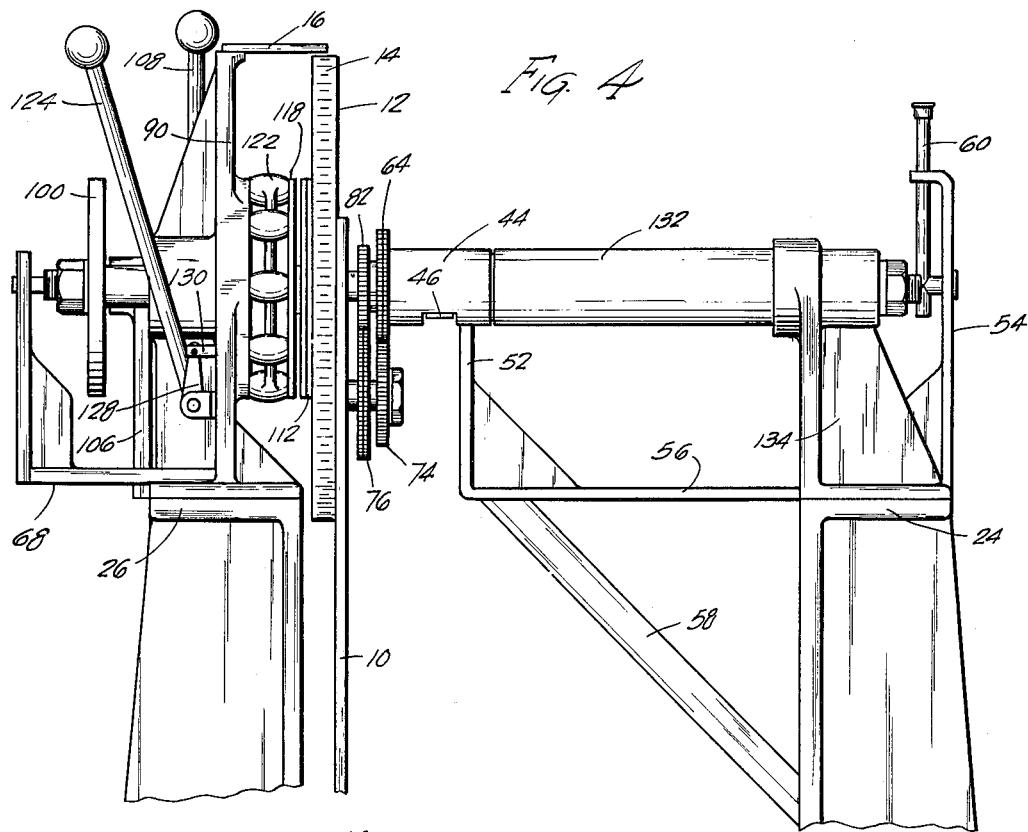
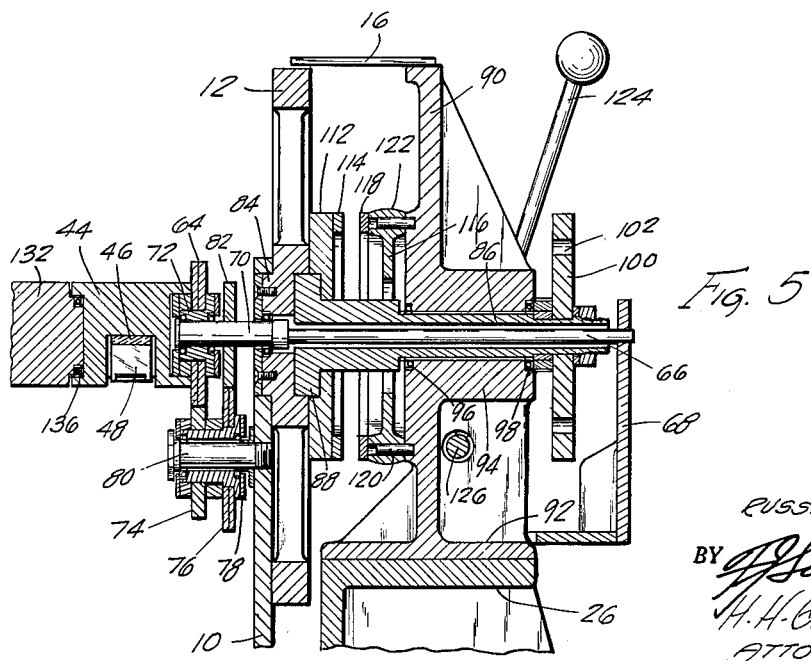
INVENTOR.
RUSSELL W. SHOLL
BY
ATTORNEYS United States Patent Office 2,737,077
Patented Mar. 6, 1956

2,737,077

TESTING DEVICE FOR OBSERVING FORCE EFFECTS ON OPTICAL INSTRUMENTS

Russell W. Sholl, Wayne, Pa.

Application December 10, 1952, Serial No. 325,242

3 Claims. (Cl. 88—14)

(Granted under Title 35, U. S. Code (1952), sec. 266)

The invention described herein may be manufactured and used by or for the Government of the United States of America for governmental purposes without the payment of any royalties thereon or therefor.

This invention relates to testing apparatus for observing objects in motion and particularly to testing apparatus for observing the effects of centrifugal forces on devices sensitive to and/or operated by such forces.

Heretofore, in the observance and the testing of bodies having a relatively high periodic motion it has been the practice to employ stroboscopic devices which depend on the persistence of vision of the eye for their operation. For bodies that have a relatively low velocity of periodic motion, or have an erratic oscillatory motion, or have parts which are affected by centrifugal forces and changes in acceleration, it has been difficult to provide satisfactory equipment for observing and testing such bodies in motion.

In the calibration and adjustment of operating units sensitive to acceleration or centrifugal forces, it has been the practice in many instances to flight test the units in aircraft and take motion pictures of the units and their operating parts while in flight. An alternative testing practice has been to make pendulum drop tests of such units and to take motion pictures of the units while being dropped. These past practices have been highly expensive and time-consuming. In addition to the costly use of aeronautical and photographic equipment, the tests were quite protracted for the reason that it was not known until after the film was developed and examined whether the test was successfully completed or not and what effect any adjustment may have had on the unit under test. Calibration procedures were extremely tedious and in many instances not too accurate because of variable factors involved. Each calibration adjustment was "blind" for it would not have been known what effect the adjustment caused until after the test film had been developed and examined.

An important object of this invention is to provide relatively inexpensive and faster operating equipment for the testing and the calibration of moving bodies subjected to changes in speed or in direction, or both, and particularly to avoiding the use of aircraft and photography for accomplishing the same purpose.

Another important object of the invention is to provide an improved apparatus for observing bodies in motion and particularly for observing and calibrating devices intended for use on aircraft and whose operating parts are sensitive to forces created by the change in direction of the aircraft.

Another important object of the invention is to provide testing equipment of the character previously described which is adapted for laboratory usage and which will give immediate visual results as each test procedes to conclusion.

A further important object of the invention is to provide an apparatus for the purpose desired which speeds up the testing and calibration time, avoids repeat tests such as might result from failure of photographic equipment heretofore employed, reduces the personnel needed for such tests and calibrating adjustments, and enables less skillful personnel to conduct the tests.

Other objects and many of the attendant advantages of this invention will be readily appreciated as the same becomes better understood by reference to the following detailed descriptions when considered in connection with the accompanying drawings wherein:

Fig. 1 is a perspective view of a testing instrument embodying the invention.

Fig. 2 is a view in elevation of one side of the upper part of the testing instrument of Fig. 1, Fig. 3 is a vertical cross sectional view through the mirror holder and taken along line 3—3 of Fig. 2, Fig. 4 is a view similar to Fig. 2 but of the opposite side of the testing instrument, Fig. 5 is a vertical longitudinal sectional view taken along the axis of the pendulum, Fig. 6 is a fragmentary side elevation of the outer end of the pendulum, and Figure 7 is a light ray diagram for the apparatus of Figures 1–6.

In order to provide the desired motions for test purposes, the present invention employs a member or arm which is movable about a fixed axis. The body or device to be observed and tested is mounted on the member spaced from the axis. The member in the illustrated embodiment of the invention is arranged to operate in a pendulous fashion, being pivotally mounted for free swinging movement in a vertical plane about a horizontal axis. However, it is understood that the member may be completely rotated about its horizontal axis or be mounted for swinging movement or rotation in a horizontal plane about a vertical axis. In either instance, power means may be employed to drive the member.

Referring particularly to the drawings the member or arm referred to above is indicated at 10. It is elongated in one direction and preferably formed of flat metallic stock. One end of the member is journaled for rotation about a horizontal axis and for this purpose it is connected to one side of a wheel 12 of substantially smaller diameter than the length of the member. The member or arm 10 is adapted to be swung to a set height and then permitted to have a free fall swinging in an arc about the axis of the shaft as a pendulum. A scale for determining the height to which the pendulum arm 10 is raised may be formed on the periphery of the wheel 12 as indicated at 14. The scale may be marked off in degrees. Cooperating with the scale is a stationary finger 16.

For a precision instrument such as illustrated herein it is desirable to mount the pendulum arm 10 and associated parts on a sturdy frame. As illustrated in Fig. 1 the supporting frame comprises a flat bottom floor engaging base 18, a pair of upright corner posts 20—20 for the front side of the instrument and a similar set of posts 22—22 for the rear side of the instrument. The upper ends of the front posts are bridged by a flat horizontal plate 24. In a similar manner the rear posts are bridged by a plate 26. The front and rear posts remain unconnected below the pivot axis of the arm and provide a clearance therebetween through which the arm swings in a pendulous fashion.

The outer end of the arm or pendulum 10 is provided with means for receiving and securely holding an object or device to be tested so that the device will assume the same path and speed of movement as that of the outer end of the pendulum. For this purpose the outer end of the arm 10 is provided with an assembly of bracket elements 28, 30 and 32 which cooperate together to clamp the device to be tested. Two of the elements 28 and 30 are adjustably slidable toward and away from one another and present the flat faces shown for clamping the device therebetween. The third element 32 may be a laterally disposed threaded member which is operable to tightly grip and hold the device in place.

The bracket assembly may be of any suitable form for securing and holding the intended unit to be tested. In the example illustrated herein, the bracket assembly is designed to hold a unit shown in dotted outline at 34 in Fig. 6 which constitutes an attachment for a motion picture gun camera used in aircraft. Such an attachment 34 is operable to bend the optical axis of the camera in order to continue filming a target under fire after the aircraft has changed its course and carried the gun off of the target. This will enable the camera to record hits on the target after the aircraft has changed its course. The operating parts of such an attachment are designed to be influenced by accelerating or centrifugal forces arising out of the change in course of the aircraft and to bend the optical axis of the camera an amount sufficient to offset the course change in order to hold the target in the camera's field of view for a longer period of time.

For the testing of such units it is desirable to provide a cross member 36 on the outer end of the pendulum arm 10 and mount a viewing element 38 on one end of the member so that it is laterally disposed with respect to the arm. The viewing element extends across the line of sight of the device under test and preferably is curved with a radius of curvature centering on the device. The viewing element may be marked with scale graduations as shown and provided with a small electric lamp 40 for illuminating the area of the scale viewed by the device under test. The scale reading viewed by the device is conveyed through a hole in bracket 28 to a mirror prism 42 mounted thereon and reflected by the latter longitudinally along the arm 10 towards its pivotal axis.

The testing apparatus of this invention is provided with a novel optical system for uninterruptedly observing the effects of accelerating and centrifugal forces on the device under test. The optical system comprises a second member swingable about the pendulum axis and provided with a light reflecting surface or mirror. This member is herein shown in the form of a cylindrically shaped block or holder 44 having an intermediate section cut away to form a flat bottom transverse slot or channel 46. The base of the channel is provided with a light reflecting surface such as the mirror 48. Preferably, as shown, the channel is so formed that the mirror 48 lies in a plane extending parallel to the axis of the shaft and substantially intersecting the same with part of the mirror lying on one side of the axis and the balance on the other side thereof. The cylindrical holder is journaled as hereinafter described to provide rotatable movement of the mirror 48 about the pendulum axis as a center.

The cylindrical holder 44 and the device holding bracket 28 are so positioned that the image reflected by the prism 42 is projected onto the mirror 48. Positioned to pick up reflections from the rotatable mirror 48 is a stationary mirror prism 50. This last reflecting element is supported from the front section of the frame in any suitable manner. It is herein shown carried on the extremity of an arm forming part of a U-shaped bracket which also carries a conveniently positioned combination eyepiece and telescope for viewing the reflected image in enlarged condition. The U-shaped bracket is best shown in Fig. 2 and comprises two upright arm sections 52 and 54 and a base section 56 which is rigidly mounted upon the cross member 24 of the front frame portion. An inclined brace 58 serves as an additional support for steadying the bracket assembly. The arm 52 carries the mirror prism 50 and is provided with an aperture therethrough for directing the reflected image forwardly toward the front of the frame. The opposite arm 54 of the bracket carries a vertical telescope viewing device 60 having a right angle section 62 for receiving the image reflected by the mirror prism 50.

An important feature of the invention is the mounting arrangement and relation of the rotatable mirror 48 to the pendulum and its swinging movement. The mirror and its holder 44 are designed to rotate about the pendulum axis in response to swinging movement of the arm 10 but at a speed unequal thereto but bearing a definite ratio thereto. In the illustrated embodiment of the invention, the mirror 48 is arranged to rotate in the same direction as the pendulum arm but at one half the speed thereof.

This is accomplished as best shown in Fig. 5 by securing a gear wheel 64 to the inner end of the mirror holder 44 and mounting the unitary assembly of the holder, mirror and gear wheel for rotation about the pendulum axis. The assembly is mounted on the projecting end of a shaft 66 which is supported on the rear section of the frame in axial alignment with the axis of the pendulum arm. Shaft 66 preferably is held stationary and arranged to take very little load.

As shown in Figs. 4 and 5 the rear end of shaft 66 is supported by an L-shaped bracket 68 forming part of the frame. In order to hold the shaft against rotation it is preferred to make the rear end of the shaft non-circular and to have it fit a similarly shaped hole in the bracket. The front projecting end of the shaft may be enlarged as shown at 70 in Fig. 5 to form a fixed support for a part of the gear drive connection between the pendulum arm 10 and the mirror holder 44. Any desired form of journal mounting, such as that shown at 72, may be employed to provide free rotation of the mirror holder assembly on the enlarged end of the shaft.

The gear wheel 64 of the mirror holder assembly meshes with a gear wheel 74 carried by the pendulum arm 10. Gear 74 forms part of a unitary assembly including a second gear wheel 76 and a journal mounting 78 which provides rotation of the assembly on a stud shaft 80. The stud shaft may be threaded or otherwise fixed to the pendulum arm below the pivotal axis thereof. The two gears 74 and 76 are jointly rotatable about the axis of the stud shaft. Suitable spacers are provided to keep the various parts in proper alignment.

Gear 76 of the stud shaft assembly meshes with a gear wheel 82 mounted on and fixed to the enlarged end of the shaft 66. Since the shaft 66 is held stationary, the gear 82 is also fixed with relation to the earth, the observer, and the gears 64, 74, and 76. Being fixed, gear 82 will impart rotation to gear 78 and its companion gear 76 when the pendulum is swung and the last mentioned gear will rotate the gear 64 and the mirror holder 46. The gear ratios are as follows: gears 64 to 74 are 1:1; gears 82 to 76 are 1:2. The ratios and mounting relation of the gears are such that the mirror 48 carried by the holder 44 is responsive to the swinging movement of the pendulum arm 10 and rotates in the same direction as the pendulum and about the latter's axis but at one-half the rate of speed thereof.

To improve accuracy, it is desirable to use a standard spring loaded, anti-back lash type of gear for one of each pair of meshing gears. Gears 64 and 74 herein are of this type and the split character of their construction identifies them as such.

The pendulum arm 10 is fixed to the large wheel 12 for joint rotation as previously described but preferably the pendulum is designed to be suspended on a projecting concentric boss 84 formed on the face of the wheel in order to take the load of the pendulum directly rather than through bolts or other fastening elements. The wheel 12 is fixed to a hollow rotatable shaft 86 which is shorter than the fixed shaft 66 and surrounds the same in spaced coaxial relation thereto as is evident in Fig. 5. Preferably the forward end of the hollow shaft is enlarged as at 88 and the wheel 12 internally shouldered to fit upon the large end of the shaft for centering support thereon.

The hollow shaft is journaled for rotation in an upright supporting member 90 having a flat bottom base 92 which rests upon and is secured to the bridging plate 26. The upright member 90 is provided with a journal body 94 having two bearings 96 and 98 which rotatably support the hollow shaft therein. The load of the wheel and pendulum is carried by the journal support 94. A bearing is provided between the forward ends of the outer hollow shaft 86 and the inner fixed shaft 66 and serves as the forward support for the inner shaft. It is noted that the finger 16 for indicating readings on the wheel scale 14 is fixed to the upper end of the upright 90.

Means is provided for releasably locking the pendulum at the desired height before permitting it to fall. For this purpose the rear end of the hollow shaft 86 is projected beyond the journal body 94 and carries a circular plate or disc 100. The disc is provided with a circular series of holes 102 near its outer periphery. The disc is fixed to the hollow shaft and therefore rotates in unison with the wheel 12 and the swinging movement of the pendulum. Reciprocable into and out of any selected hole 102 in the disc 100 is a pin 104. The pin is otherwise stationarily supported in a subsidiary upright member 106 secured to the base 92 of the main upright supporting member 90. When the pin enters a hole in the disc it locks the pendulum against swinging movement.

The locking pin 104 is retractable to a release position by means of a lever 108. The lever is pivoted at its lower end for swinging movement in a vertical plane extending in a fore and aft direction. The pin 104 is pivotally coupled to the lever intermediate its height as shown in Fig. 2 and it is evident that that swinging movement of the lever will reciprocate the pin into and out of the holes of the disc. The lever itself may be provided with a detent form of locking mechanism to prevent accidental release movement thereof. As also illustrated in Fig. 2 a handle type of catch is shown at 110 which is engageable in a recess in the upper end of the subsidiary upright 106 to hold the lever from accidental movement.

Means is provided for quickly slowing down and stopping the swinging movement of the pendulum. For this purpose the rear side of the wheel carries a circular plate 112 having a rearwardly facing friction ring 114. Movable toward the friction ring is a non-rotatable but axially movable brake member 116 having a friction ring 118 for engaging the friction ring of the wheel. The brake member 116 is supported on a circular series of pins 120 projecting forwardly from the upright 90 and having its center coinciding with the common axis of the two shafts 66 and 86. The periphery of the member 116 carries a plurality of barrel shaped bosses 122 each arranged opposite a pin 120 and axially bored to receive the pin as shown in Fig. 5. The member 116 and its peripheral bosses are held against rotation by the pins 120 but have an axial movement toward and away from the wheel and its friction ring 114.

The movement of the braking member 116 is controlled by a lever 124 preferably located on the side of the upright supporting structure 90 opposite to lever 108. The brake lever 124 is fixed to one end of a rock shaft 126 extending crosswise of the supporting structure. Fixed to each end of the rock shaft is a similarly formed arm 128. Pivotally connected to the outer end of each arm is a pin 130 which is similar to pins 120 but substantially of longer dimension. Each pin 130 extends through the supporting structure from the rear side to the front side thereof and is reciprocatingly supported in the structure. The forward end of each pin 130 enters the bore of an aligned boss 122 of the brake member and is press fitted or otherwise rigidly secured therein. It is evident that reciprocal movement of the two pins 130 will shift the brake member either toward or away from the friction surface on the wheel 12 and that such movement of the brake member can be controlled by the lever 124.

It is preferred to provide a journal support for the outer or front end of the rotatable mirror holder 44 in order to steady its movement and prevent accidental displacement. A cylindrical bar 132, which may be of the same diameter as the mirror holder 44, is supported by an upright structure 134 mounted on the bridging plate 24 of the front frame section and positioned in axial alignment with the mirror holder. The rear end of the bar 132 interengages with the mirror holder in the manner shown in Fig. 5 and a bearing 136 is provided between these two members in order to allow the holder to rotate freely relative to the bar while supported thereby.

To operate the instrument, a device to be tested, such as the unit 34 shown in dotted outline in Fig. 6, is mounted on the pendulum arm 10 by means of the bracket members 28, 30 and 32 and so that its optical axis is directed on the target scale 38. The pendulum is then raised to the desired height as indicated by noting the readings furnished by the wheel scale 14 and the index finger 16. At the desired height the pendulum is releasably locked by manipulating the lever 108 and its locking pin 104. The holes 102 in the disc 100 may be spaced apart from one another by any uniform number of degrees of a circle. After it is releasably locked at the desired height, the observer may check the centering of the scale in the telescopic eyepiece system 60—62.

The pendulum is then released for free fall by shifting the lever to extract the locking pin from the disc 100. As the pendulum swings on its axis, the gear 76 carried thereby is rotated on the stud shaft 80 as a result of its engagement with the stationary gear 82 on shaft 66. The amount of rotation of gear 76 is one-half the pendulum rotation, as gears 76 and 82 are 2:1 ratio. The two gears 74 and 76 on the stud shaft rotate jointly and in a direction opposite to gear 82. Gear 74 drives gear 64 of the mirror holder assembly in the opposite direction but at the same rate since the two gears are 1:1 ratio. Thus the mirror holder and the mirror 48 moves in the same direction as the pendulum but at one-half its rate.

Throughout the movement of the pendulum the image of the target scale or other viewed object remains fixed relative to the observer. This is the result of the fact that as the line of sight deflected by mirror 48 through mirror 42 on the outer end of the pendulum is moved by the pendulum a given amount represented by "$x$," the mirror 48 moves an amount equal to $$\frac{x}{2}$$

Since, in accordance with the laws of reflection of a plane mirror the image moves through twice the angle of the mirror, the condition is fulfilled for holding the image fixed relative to the observer.

The pendulum may be allowed to swing back and forth several times while the target scale or other object carried on the outer end of the pendulum is continuously viewed by the observer through the mirror system. However, to shorten the testing time it is desirable to brake the pendulum to a stop by operating lever 124 and the associated brake member 116. In this manner the effects of acceleration or centrifugal forces on devices sensitive thereto may be continuously observed under the same conditions and quickly tested and calibrated if the devices are capable of adjustment.

Obviously many modifications and variations of the present invention are possible in the light of the above teachings. It is therefore to be understood that within the scope of the appended claims the invention may be practiced otherwise than as specifically described.

What is claimed is:

1. Test apparatus for an optical device having an optical axis which is sensitive to changes in the velocity and direction of movement thereof said apparatus comprising a pendulum which pivots adjacent one extremity about a fixed axis; means for removably securing the optical device to the pendulum adjacent the opposite extremity thereof; a light reflecting element which is rotatably positioned on the fixed axis; and means including interconnecting gears between the light reflecting element and the pendulum for rotating the light reflecting element in the same direction as and at one half the speed of the pendulum and for continuously causing the line of sight between the viewing instrument and the optical device to appear to remain unchanged even as the optical device rotates about the fixed axis.

2. Test apparatus for an optical device having an optical axis which is sensitive to changes in the velocity and direction of movement thereof said apparatus comprising a pendulum which pivots adjacent one extremity about a fixed axis; means for removably securing the optical device to the pendulum adjacent the opposite extremity thereof; a light reflecting element which is rotatably positioned on the said fixed axis; interconnecting means between the light reflecting element and the pendulum for rotating the light reflecting element in the same direction as and at one half the speed of the pendulum; a light source positioned on the pendulum; means for directing light from the source through the said optical device toward the light reflecting element; and means for continuously observing the image of the source in the light reflecting element from a preselected fixed point.

3. Test apparatus for an optical device having an optical axis which is sensitive to changes in the velocity and direction of movement thereof said apparatus comprising a fixed shaft; an elongated pendulum which is rotatably mounted on the shaft; a cross arm secured to the free extremity of the pendulum; means for removably securing the optical device to the pendulum between the shaft and the cross arm; an arcuate graduated scale which is secured to the cross arm such that a line of sight from any point along the periphery of the scale to the optical device follows a radial path of the arc described by the scale; a light source which is adjustably secured to the scale; a mirror element which is rotatably positioned on the extended axis of the said shaft; gear means positioned between the mirror element and the pendulum for rotating the mirror element in the same direction as and at one half the speed of the pendulum; means for directing light from the source through the optical device toward the mirror element; and means for continuously observing the image of the source in the mirror element from a preselected fixed point.

References Cited in the file of this patent

UNITED STATES PATENTS

| | | |
|---|---|---|
| 815,657 | Swasey | Mar. 20, 1906 |
| 1,432,360 | Rouge | Oct. 17, 1922 |
| 2,121,773 | Eddison | June 28, 1938 |
| 2,153,448 | Boaz | Apr. 4, 1939 |
| 2,184,615 | Gunther | Dec. 26, 1939 |
| 2,498,844 | Sears et al. | Feb. 28, 1950 |